(12) United States Patent
Kuenzel (10) Patent No.: US 7,296,953 B2
(45) Date of Patent: Nov. 20, 2007

(54) DEEP HOLE DRILL

(75) Inventor: Lothar Kuenzel, Pliezhausen (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 11/619,311

(22) Filed: Jan. 3, 2007

(65) Prior Publication Data

US 2007/0110529 A1     May 17, 2007

Related U.S. Application Data

(63) Continuation of application No. 11/154,770, filed on Jun. 16, 2005, now abandoned, which is a continuation of application No. PCT/DE03/04274, filed on Dec. 18, 2003.

(30) Foreign Application Priority Data

Dec. 19, 2002   (DE) ........................... 202 19 754 U (51) Int. Cl.
*B23B 41/02* (2006.01)

(52) U.S. Cl. .................... 408/83; 408/57; 408/199; 408/713

(58) Field of Classification Search ............ 408/80–83, 408/57, 59, 199, 227, 705, 713
See application file for complete search history.

(56) References Cited

U.S. PATENT DOCUMENTS

| 1,362,871 | A |   | 12/1920 | Kelly |
| 3,094,016 | A |   | 6/1963  | Kleine |
| 3,376,763 | A | * | 4/1968  | Welles ........................ 408/199 |
| 3,422,706 | A |   | 1/1969  | Lunsford |
| 3,751,177 | A |   | 8/1973  | Faber |
| 4,212,569 | A |   | 7/1980  | Andersson et al. |
| 4,240,770 | A |   | 12/1980 | Berstein |
| 4,437,802 | A |   | 3/1984  | Hall, Jr. |
| 4,666,350 | A |   | 5/1987  | Nicholas |
| 4,813,824 | A |   | 3/1989  | Grunsky |
| 5,697,737 | A |   | 12/1997 | Danielsson et al. |
| 5,820,318 | A |   | 10/1998 | Danielsson et al. |

(Continued)

FOREIGN PATENT DOCUMENTS

DE        3200674        9/1982

(Continued)

OTHER PUBLICATIONS

Botek, Präzisions-Bohrtechnik GmbH, D-72585 Riederich, gaz. Sep. 9, 1997, Schultz, Änd-Stand: Feb. 24, 1999, BN-0122 B1.3, 1 page.

(Continued)

*Primary Examiner*—Daniel W. Howell
(74) *Attorney, Agent, or Firm*—Burr & Brown (57) ABSTRACT

A deep hole drill comprising a cutter carrier, a replaceable cutting insert and at least one replaceable guide strip. The cutter carrier is embodied in such a way that it can be used for a predetermined nominal diameter range. In order to adjust the deep hole drill to the various desired nominal diameters in a quicker and more precise manner, a separate kit consisting of a cutting insert and at least one guide strip is associated with each nominal diameter. Fixed stops are provided on the cutter carrier for said kit.

12 Claims, 4 Drawing Sheets

U.S. PATENT DOCUMENTS 5,971,674 A 10/1999 Holley
6,602,028 B1 8/2003 Lindblom et al.

FOREIGN PATENT DOCUMENTS

EP 0 418 437 3/1991
FR 892 182 3/1944

OTHER PUBLICATIONS

Weck, Manfred, Vorwort zum Kompendium "Werkzeugmaschinen", VDI-Verlag GmbH, Düsseldorf 1988, pp. 160-165.
Hertel, 1000 D Werkzeuge für Bearbeitungszentren, 4 pages.
Google Search Web Page Printout, searched botek und "Typ 01".
"Der gewählte Leserdienst-Code in", Leserdienst No. 00438, Seite 1 von 1, Werkzeug Technik, Technologie System Logistik, Botek Praezisionstechnik, 1 page.
Werkzeug Technik: Inhaltsverzeichnis Heft Nummer 68, Seite 1, von1, Tiefbohrwerkzeuge, Botek Praezisionstechnik, 1 page.
Botek, Tiefbohrsysteme - Hartmetallwerkzeuge, Tiefbohwerkzeuge Typ 01, Archiv 01-0501-01, Bohrbereich: 18,00-43,99, pp. 1-16.
Botek, Präzisions-Bohrtechnik GmbH, D-72585 Riederich, Aufbohrkopf Typ 32,99-321100-105, 3 pages.
Botek, Tiefbohrsysteme - Hartmetallwerkzeuge, Tiefbohwerkzeuge Typ 01, Archiv 01-0501-01, Bohrbereich: 18,00-43,99, pp. 1-16.
Botek, Tiefbohrsysteme - Hartmetallwerkzeuge, Vollbohrköpfe, Typ 11/Typ 61, Bohrwerkzeuge System BTA, Bohrbereich: 18,00-36,99 mm, pp. 1-15.
Botek, botek-Vollbohrkopf, Typ 42, System BTA und Ejektor, Bohrbereich ø 65,00 mm - 231,24 mm, pp. 1-3.
Hertel, Katalog 5020-23, 4 pages.

* cited by examiner

DEEP HOLE DRILL

CROSS-REFERENCE TO RELATED APPLICATIONS

This application claims the benefit of German Patent Application No. 202 19 754.9, filed Dec. 19, 2002, the entirety of which is incorporated herein by reference.

This application is a continuation of U.S. application Ser. No. 11/154,770, now abandoned filed Jun. 16, 2005, which is a continuation of International Application PCT/DE2003/004274, filed Dec. 18, 2003, the entireties of which are incorporated herein by reference.

BACKGROUND OF THE INVENTION

The invention relates to a deep hole drill comprising a cutter carrier, a replaceable cutting insert and at least one replaceable guide strip wherein the cutter carrier can be used for a predetermined nominal diameter range, and a range for equipping a cutter carrier for such a deep hole drill wherein a new type of equipping method can be implemented with this range.

In single-lip deep hole drills the swarf is removed by means of a supplied lubricant via the relatively large, straight-grooved machined groove as a result of the single-lip geometry. The actual cutting process takes place by means of a drill cutter which can be located on a cutting plate or a cutting insert, for example which is screwed onto the cutter carrier. At the same time, during drilling the tool is supported over its circumference in the drill hole by corresponding guide strips.

Deep hole drills with such replaceable cutting inserts/ guide strips are highly economical and have good cutting performance. This is because, when the cutters or the guide strips wear, there is no need to purchase an expensive complete tool but only the relatively inexpensive cutting insert or the guide strip. In addition, the cutter carrier can be used not only for one nominal diameter but within an entire nominal diameter range.

Such a generic tool is shown for example in the prospectus "Deep hole drills type 01", No. 01-0501-01 of the company "botek Präzisionsbohrtechnik GmbH". This drilling tool is fitted with a drill shank soldered to a clamping sleeve and a drill head connected thereto. The drill head has corresponding seats with threaded holes for one cutting plate and for two guide strips by which means the cutting plate and the two guide strips can be screwed to the drill head. The alignment of the position of the cutting edge i.e., the adjustment of the precise nominal diameter within the nominal diameter range for which the deep hole drill is provided is accomplished in this case by means of a replaceable adjustment plate which forms a stop for the cutting plate. The stop is located on the side of the replaceable plate opposite to the minor cutting edge, i.e. before the replaceable plate is attached to the drill head, an adjustment, plate suitably selected for the desired nominal diameter is screwed onto the drill head parallel to the longitudinal axis of the tool so that the replaceable plate abuts against the adjustment plate with its side opposite to the minor cutting edge. The thickness of the adjustment plate used thus determines the position of the minor cutting edge and therefore the nominal diameter of the hole. In addition to the adjustment plate itself, an adjustment wedge is provided for pre-adjustment of the stop surface of the adjustment plate on the corresponding tool back, which can be inserted into a hole ending on the back of the adjustment plate and fixed with a screw. Thus, a plurality of time-consuming work processes are required to adjust the position of the cutting edge to the desired nominal diameter or to equip the cutter carrier with the components provided for the corresponding nominal diameter.

However, no positional displacement of the guide strips is provided. The same guide strips are used for the entire nominal diameter range. Thus, accurate guidance of the drill cannot be ensured.

BRIEF SUMMARY OF THE INVENTION

It is thus the object of the invention to provide a deep hole drill comprising a cutter carrier which can be used for a plurality of nominal diameters in a nominal diameter range, as well as a replaceable cutting insert and at least one replaceable guide strip, which has a simple structure and allows easy-to-handle and rapid adjustment of the tool to the desired nominal diameter. It is a further object to provide a range of inserts for equipping a cutter carrier for deep hole drilling tools which can be used to implement a new type of cutter carrier equipping method by making available a suitable range of inserts.

This object is solved with regard to the deep hole drill by the deep hole drills and deep hole drill sets according to the present invention. The new type of equipping method which constitutes an independent invention is characterised as follows: the method allows a cutter carrier of a deep hole drill, which can be used universally within a nominal diameter range ($\Delta ND$), such as for example a drill especially according to one of the present claims, to be equipped according to the nominal diameter with a kit comprising a replaceable cutting insert and at least one replaceable guide strip provided for a certain nominal diameter. The method is characterized by the following steps:

selecting a kit provided for a certain nominal diameter from a range of kits comprising all the desired nominal diameters ($ND_1$-$ND_5$) in a specified nominal diameter range ($\Delta ND$), especially where each cutting insert and each guide strip having counter-stop surfaces with which they can be fixed in position at fixed stops on the cutter carrier or where (1) the cutting inserts and the guide strips can each be screwed to the cutter carrier, (2) the cutting inserts each have a cutting insert through hole at the same distance from the respective counter-stop surfaces, and (3) the guide strips each have a guide strip through hole which extends between its counter-stop surface and a supporting surface, and fixing the position of the cutting insert (2) and the at least one guide strip of the selected kit by means of fixed stops on the cutter carrier.

According to the invention, a selection of kits is associated with the cutter carrier used in a certain nominal diameter range. A kit comprising a cutter carrier and at least one corresponding guide strip is available for each desired nominal diameter. Cutting inserts and guide strips have counter-stop surfaces by which means they can be fixed by means of fixed universally fitting stops on the cutter carrier in the position predetermined by the stops. According to the invention, only the kit corresponding to a desired nominal diameter must be selected from a range of kits and fixed on the cutter carrier by means of the fixed stops thereon.

In this way, a simple and time-saving adjustment of the drill to the desired nominal diameter is achieved. This is because apart from attaching the desired cutting insert and the corresponding guide strips whilst fixing the position by the stops already present on the cutter carrier, no further work processes are necessary. The geometry of the cutter carrier is configured as universally fitting for all the associated kits so that the diameter adjustment is merely made by selecting the appropriate kit. On the whole, such a high accuracy of the diameter adjustment can be achieved because any incorrect adjustments are rendered impossible by the fixedly predetermined stops which merely define the position of the respective cutting insert and the guide strips. This is because any such additional adjustment is completely eliminated.

Additional components which would be necessary for such an adjustment are no longer required in the deep hole drill according to the invention. In addition to the reduced number of parts, in the deep hole drill according to the invention, increased stability and strength of the cutter carrier is achieved compared with corresponding known tools since the cutter carrier is not weakened by additional recesses and threaded holes for adjustment plates etc. but fills the predetermined space as completely as possible.

As a result, the deep hole drill according to the invention is suitable for diameters, e.g., from 16 mm up to around 40 mm, which are very small compared to the nominal diameters which can be achieved in conventional tools (botek: from 18 mm upwards). Tests have shown that good results are achieved with ratios of drilling depth to diameter of 10:1 to 80:1 with a total tool length of up to 3000 mm.

Advantageous further developments of the invention are the subject matter of the dependent claims.

The cutting insert is advantageously screwed to the cutter carrier. For this purpose a threaded hole is provided on the cutting insert seat on the cutter carrier whereas a through hole is provided on the cutting inserts so that the cutting inserts can be screwed onto the cutter carrier. In this case, the distance between the through hole and the counter-stop surfaces is the same for all cutting inserts, i.e. all cutting inserts fit the geometry predefined by the universal cutter carrier. The threaded hole on the cutting insert seat has an offset to a through hole on the cutting insert so that, the cutting insert is pressed on the stop when the cutting insert is screwed on the cutting insert seat. The offset is very small (of the order of magnitude of $1/100$ mm) so that no deformation of the cutting insert or the cutter carrier occurs but merely to a fixing of the position of the cutting insert at the predetermined stop via the (elastic) deformation of the screw. In this way, equipping the cutter carrier with the cutting insert is further simplified. However, other fixing possibilities are also feasible as fixing for the cutting insert or the guide strip, for example, a guide groove on the cutter carrier into which a T-shaped wedge molded on the cutting insert is inserted.

The guide strips advantageously each have a through hole for screwing into corresponding threaded holes on the cutter carrier. The guide strips inserted in corresponding grooves on the cutter carrier are screwed into threaded holes on the cutter carrier by means of a through hole running in the radial direction. The through hole extends in each case between a supporting or outer circumferential surface and the counter-stop surface of the guide strip.

In a preferred aspect of the present invention, the distance of the through hole to the minor cutting edge of a cutting insert to the next larger increases by the same amount as the distance of the supporting surface and the counter-stop surface of the associated guide strip to the next larger guide strip. This ensures that the minor cutting edge is well supported by the guide strip(s) in the hole over the entire diameter range. The increase can be linear in the entire diameter range or it can follow any other pattern, for example, a similarity series.

Replaceable plates which can be exchanged after their cutting edge has worn have proved particularly suitable as cutting inserts. Errors which could occur as a result of using an indexable insert where a minor cutting edge or land is worn are thus avoided from the outset.

The use of precise and (disposable) replaceable plates and guide strips fabricated separately for each nominal diameter offers many advantages compared with using turnover plates having the same design for several nominal diameters which must be adjusted to the desired nominal. diameter by means of an adjusting disk, and standard guide strips which do not allow any adjustment to the nominal diameter:

A suitable set (replaceable plate and guide strip(s)) must be provided for each nominal diameter. However it is clear that the equipping or assembly of the deep hole drill is considerably simplified if the nominal diameter is simply adjusted by selecting the corresponding kit. This is because the iterative process of using turnover plate, adjustment plate, checking measurements etc. is omitted.

The adjustment of the nominal diameter is thus removed from the assembly process into a previous production process of the replaceable plates and the guide strips especially for that nominal diameter which takes place under defined conditions and in an automated fashion so that in addition to facilitating the assembly of the deep hole drill, an overall higher precision can be achieved during the adjustment of the nominal diameter.

In a preferred aspect of the present invention, a recess is located on the cutter carrier at the tip of the deep hole drill in the tool face, which is defined by a cutting insert seat by two side surfaces, forming a two-sided stop for the cutting insert. It is particularly easy to equip the cutter carrier thus configured since the cutting insert can be fixed in position in all three coordinate directions using a handle and only needs to be screwed on.

If the two stop surfaces span an angle smaller than 90° and the side surfaces facing the two stop surfaces span a larger angle, it is additionally ensured that no uncertainty arises in the position of the cutting insert as a result of tolerance deviations in the inclination of the side surfaces towards one another but in any case two-sided stopping of the replaceable cutting plate or the cutting insert is provided.

The deep hole drill is advantageously embodied as a single cutter or single-lip deep hole drill. However, the invention is not restricted to single-lip tools. In particular, double-lipped embodiments would also be feasible where a further replaceable plate is provided instead of a guide strip per kit, for example. Triple cutters with three replaceable plates per kit would also be feasible.

The use of hard metal cutting inserts and guide strips ensures that the kits for the deep hole drill according to the invention have a particularly high wear resistance. Alternatively thereto, the cutting insert and guide strip have a hard material coating. A combination, that is hard-or soft-coated hard-metal cutting inserts and guide strips would also he feasible, likewise ceramic cutting inserts and guide strips. In this case, hard metals consist of metallic hard materials which can be described as relatively brittle because of their high hardness and binders or binder metals predominantly from the iron group (iron, cobalt, zinc) which are relatively soft and tough and are sintered together with the hard materials. Mixtures of ceramics and metals (cermets) are also included among the hard metals. In the hard metal the high hardness and therefore wear resistance of the metallic hard material is combined with the toughness of a binder metal. The desired properties of the drill shank can be adjusted exactly according to the mixing ratio. In addition t,o nitride-hardened layers, cubic boron nitride, corundum, sialone or other nonmetallic materials are suitable as coating materials.

On the whole, various alternatives are provided whereby the drilling tool can be used in a universal spectrum of materials for processing, whether this be rock, metal, CFK etc.

Heat-treatable steel has proved to be an advantageous material for the cutter carrier, especially with regard to toughness and torsional resistance i.e. the transferable torque. It would also be feasible to use a cutter carrier equipped with replaceable cutting plates, which is itself made of HSS or hard metal.

In a preferred aspect according to the present invention, the cutter carrier is a drill head joined to the drill shank in a material-closing fashion, for example, brazed on the drill shaft. The drill head which is subject to higher loading can then be made of a more expensive material and can have a geometry which is more expensive to produce, especially the internal cooling channel(s) whereas the drill shank which is subject to lower loading is made of a cheaper material which is easier to machine and receives its simpler geometry in its own production method.

The internal cooling channel has, for example, one or two circular cross-sections at the drill tip whereas a circular through hole is inserted on the drill shank.

In another preferred aspect of the present invention, the drill shank consists of a formed tube of heat-treatable steel. The straight-running machined groove can be impressed into the tube in an easily managed and fast pressing or rolling processing step wherein favourable forming for the internal cooling channel can be achieved at the same time.

The individual features of the embodiments according to the claims can be arbitrarily combined as far as this seems logical.

BRIEF DESCRIPTION OF THE DRAWING FIGURES

Preferred embodiments of the invention are explained in detail subsequently with reference to the schematic drawings. In the figures.

DETAILED DESCRIPTION OF THE INVENTION

Figures 1, 2:
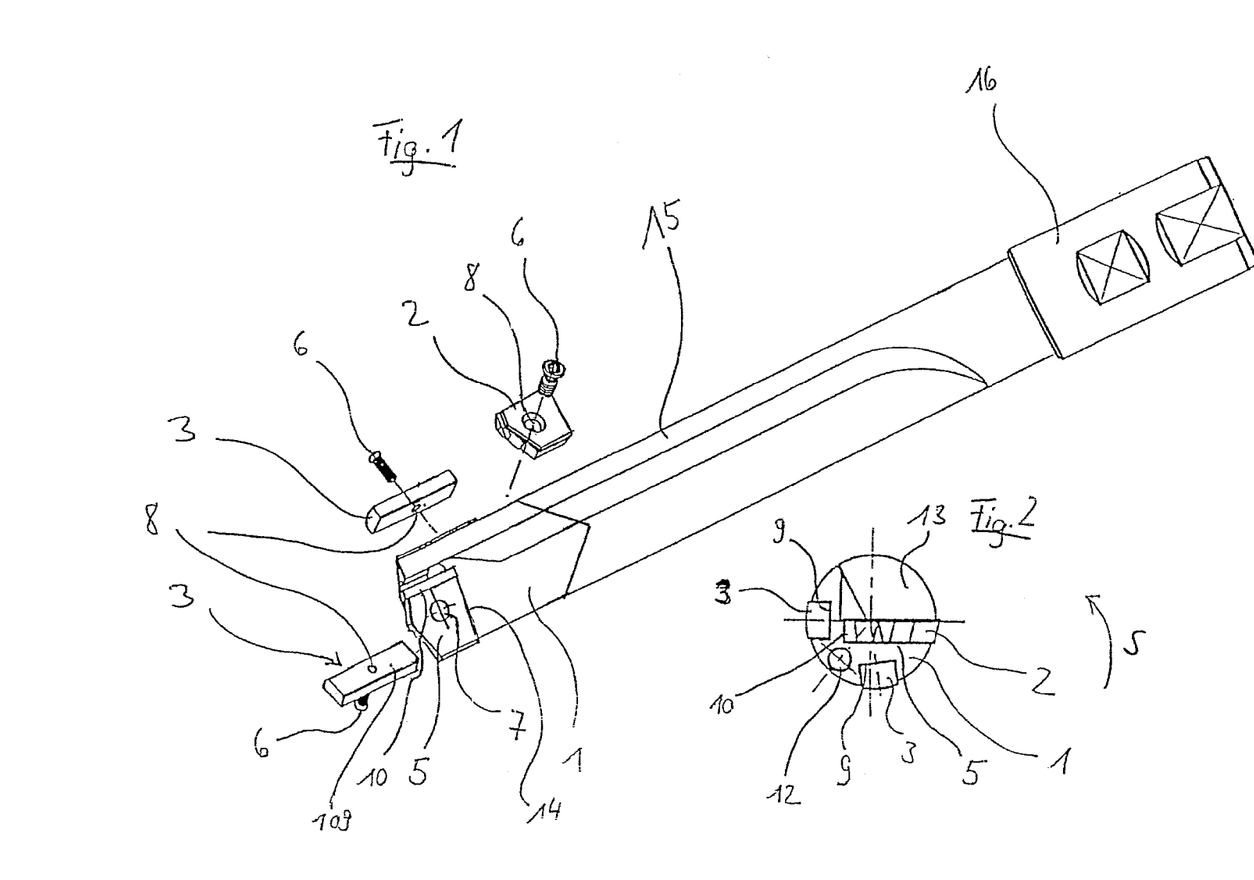
FIG. 1. is a perspective exploded view of an embodiment of the deep hole drill according to the invention.
FIG. 2 is a plan view of the drill tip of the single-lipped deep hole drill shown in FIG. 1.

Reference is first made to FIGS. 1 and 2 which show a single-lipped embodiment of the deep hole drill according to the invention. The reference number 1 designates a drill head which is soldered onto a drill shank 15 which in turn is soldered into a clamping sleeve 16. The machined groove is substantially v-shaped where the angle spanned by the machined and unmachined surface is approximately 90°.

At its tip, on the machined surface of the machined groove 13 the drill head has a recess which with its rear surface 5 and the two side surfaces 10, 14 forms a seat for a replaceable cutting plate 2. A central threaded hole 7 is drilled into the rear surface 5 which receives a screw 6 guided through a through hole in the replaceable cutting plate 2.

Furthermore, at the axial height of the replaceable cutting plate seat two recesses for guide strips 3 are provided over the circumference of the drill, which abut against a stop surface 9 with their radially-pointing plane counter-stop surfaces 109. Each surface 9 has a central threaded hole for screwing the guide strips 3.

In the same way as the guide strips 3, the replaceable cutting plate 2 has a through hole 8 which, when inserted, is in alignment with a corresponding threaded hole 7 with a minimal offset so that the replaceable cutting plate 2 and also the guide strips 3 can each be screwed rapidly using a single screw 6.

In the embodiment shown the fixed stop for the guide strips consists in each case of the rear surface 9 of the guide strip seat on the drill head whereas the width of the guide strips is the same for all nominal diameters. The guide strips of the kits for different nominal diameters thus differ only in respect, of their radial thickness, i.e., the distance between the outer circumferential surface and the counter-stop surface 109 which is defined by the respective nominal diameter of the tool.

Figure 4:
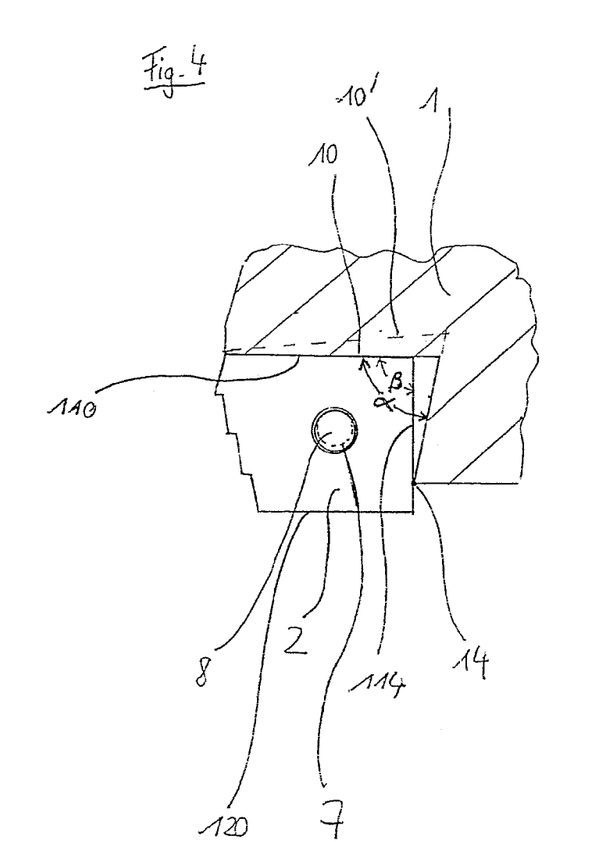
FIG. 4 is a detailed view of the inserted replaceable cutting plate of the deep hole drill from FIG. 1.

In order to explain the positioning of the replaceable cutting plate 2 over the threaded hole 7 and the through hole 8, reference is made to FIG. 4 which shows an enlarged plan view of the inserted replaceable plate 2. It can be seen that the through hole 8, shown by a solid line, and the threaded hole 7, shown by a dashed line, are at a small offset with respect to one another which has the result that when the replaceable cutting plate 2 is screwed on, the plate 2 is pushed with its counter-stop side surface 110 against the stop side surface 10 of the cutting plate seat. However this offset is shown clearly oversized here.

Furthermore, with its second counter-stop side surface 114 running orthogonally to the first, the plate 2 impacts against a point located on the second stop side surface 14 of the cutting plate seat and its position is thus determined by the surfaces 5, 10, 14 in all three coordinate directions.

It is clear that all replaceable cutting plates 2 for any nominal diameter always have a through hole 8 at a predetermined distance from the two counter-stop side surfaces 114, 110. This can be seen particularly clearly from FIG. 7 which is explained further below.

It can also be seen from FIG. 4 that the two stop side surfaces 10, 14 are inclined at an angle $\alpha$ of 80° with respect to one another whereas the two counter-stop surfaces 110, 114 span an angle $\beta$ of 90°. In this case, the cutting plate 2 preferably abuts against the stop surface 10 with the entire counter-stop side 110. A linear stop would also be feasible, as is shown by an inclined stop surface 10' with a dashed line. The angular shaping of the stop ensures that, inadequate abutment of the replaceable cutting plate 2 on the cutter carrier (the drill head 1) does not occur as a result of tolerance deviations.

Figure 5:
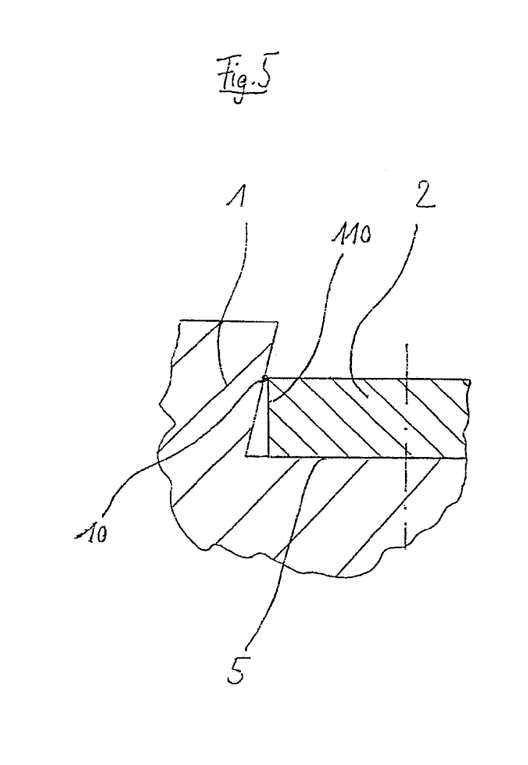
FIG. 5 is a detailed view of the inserted replaceable cutting plate of a modified embodiment.

FIG. 5 shows a modification where linear contact, of the cutting plate 2 on the stop 10 is achieved by the base surface 5 of the cutting plate seat and the stop surface 10 spanning an angle smaller than 90° whereas the back of the cutting plate 2 and the counter-stop surface 110 are at an angle of 90° with respect to one another.

Figure 3:
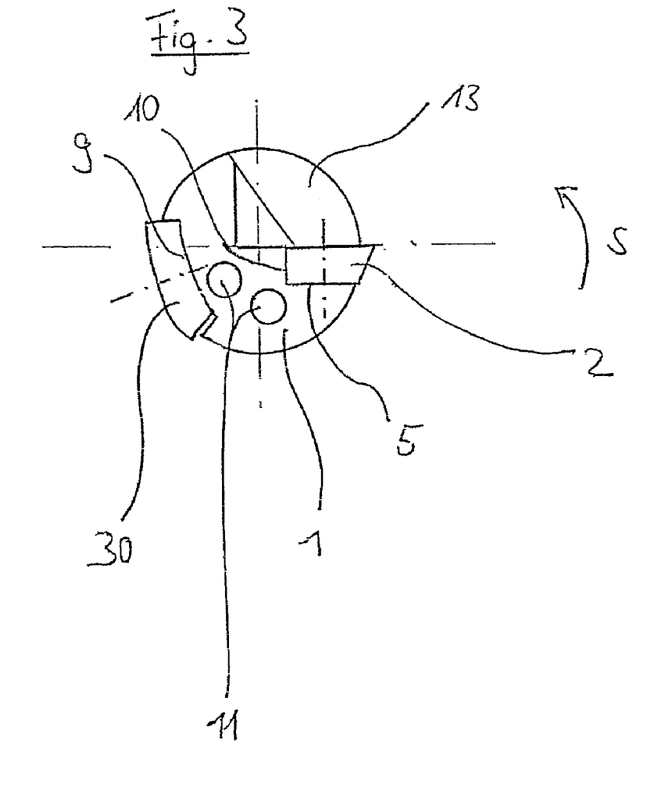
FIG. 3 is a plan view of the drill tip of a modified embodiment.

The embodiment of the deep hole drilling tool according to the invention shown in FIG. 1 comprises a single-lipped deep hole drill with a cutter on the replaceable plate 2 which is supported by means of two guide strips 3 over its diameter in the hole. With reference to the views of the drills tip shown in FIGS. 2 and 3, this embodiment is compared with a further embodiment which has only one guide strip 30. It is found that the invention can be realized in the same way using this type of deep hole drill. In this case, the additional advantage arises that more space is available for the internal cooling channel (see outlet openings 12, 11).

Figure 7:
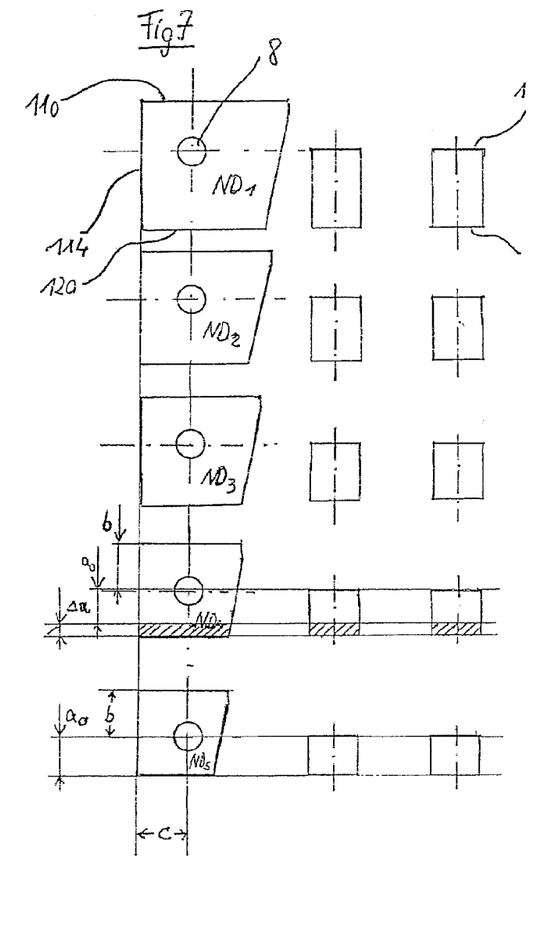
FIG. 7 shows the kits associated with the nominal diameters from FIG. 4.

FIG. 7 shows five kits, each comprising a replaceable cutting plate and two guide strips for equipping the drill shown in FIG. 1.

Figure 6:
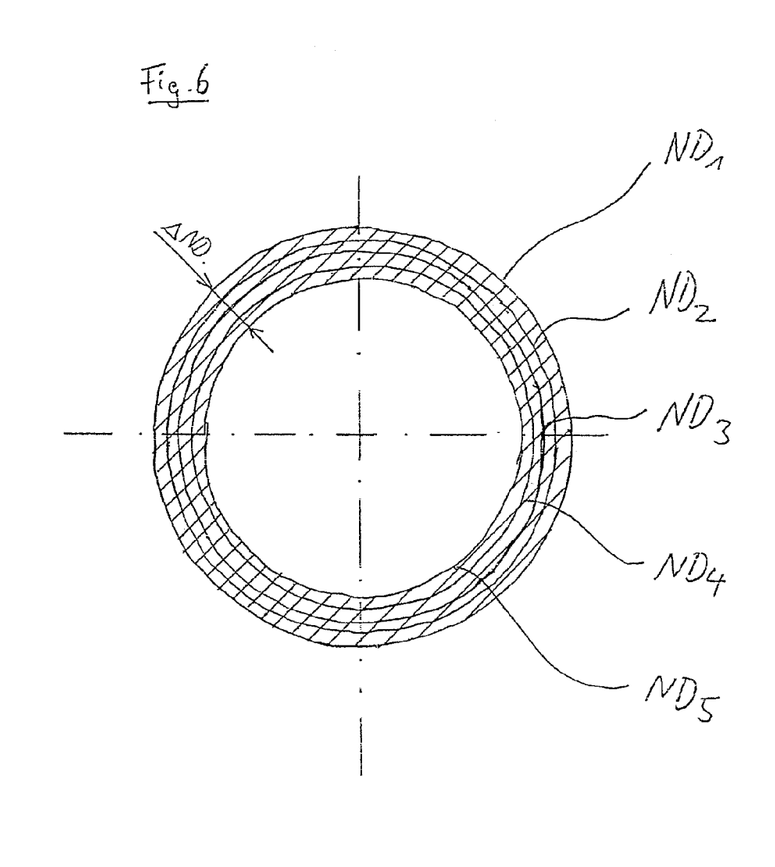
FIG. 6 is a nominal diameter range which includes five nominal diameters.

The kits cover five nominal diameters $ND_1$ to $ND_5$ which lie in a nominal diameter range $\Delta ND$ (see FIG. 6). For better clarity, the through hole 8, the counter-stop surfaces 110, 114 and the minor cutting edge 120 are only designated on the replaceable cutting plate for the largest nominal diameter $ND_1$ and on a relevant guide strip, the counter-stop surface 109 and the supporting surface 50.

In FIG. 6 the hatched area shows the nominal diameter range $\Delta ND$ in which the universally fitting drill head of the deep hole drill from FIG. 1 can be adjusted to the five nominal diameters $ND_1$ to $ND_5$ by replacing the cutting plates and guide strips. In this case, the through hole 8 on all cutting plates has the same distance c from the counter-stop surface 114 and b from the counter-stop surface 110. The distance of the through hole from the minor cutting edge which determines the hole diameter, increases on the other hand from the value $a_0$ at the nominal diameter $ND_5$ and specifically from $ND_5$ to $ND_4$ by the value $\Delta a$. It can be seen that the radial thickness of the guide strip, i.e. the length of the through hole (shown dashed) increases accordingly.

Naturally, deviations from the variants shown are also possible without departing from the basic idea of the invention.

The invention claimed is:

1. A deep hole drill comprising:
   a cutter carrier;
   at least one replaceable cutting insert attached to the cutter carrier; and
   at least one replaceable guide strip attached to the cutter carrier,
   wherein the cutter carrier comprises a two-sided stop comprising two stop surfaces defining a cutter insert seat, the two stop surfaces spanning a first angle smaller than 90°, the cutter carrier further comprises at least one fixed stop for the guide strip, and
   wherein two counter-stop surfaces of the cutter insert facing the two stop surfaces, respectively, span a second angle, the second angle being larger than the first angle.

2. The deep hole drill according to claim 1, wherein a through hole for a screw is provided on the cutter insert, the through hole having an offset when the cutter insert rests on the two-sided stop for the cutting insert with respect to a corresponding threaded hole on the cutter insert seat on the cutter carrier, so that the cutter insert is pressed against the two-sided stop during screwing of the screw through the through hole and into the threaded hole.

3. The deep hole drill according to claim 1, wherein the cutter insert comprises a replaceable plate.

4. The deep hole drill according to claim 1, wherein the cutter insert and the guide strip consist of hard metal.

5. The deep hole drill according to claim 1, wherein the cutter insert and the guide strip have a hard material coating.

6. The deep hole drill according to claim 1, wherein the drill is a single-lip deep hole drill with internal cooling.

7. The deep hole drill according to claim 1, wherein the cutter carrier consists of heat-treatable steel.

8. The deep hole drill according to claim 1, wherein the cutter carrier is a drill head which is joined to a drill shank soldered into a clamping sleeve.

9. The deep hole drill according to claim 8, wherein the drill shank consists of an unformed, heat-treated steel tube.

10. A deep hole drill set comprising:
    a cutter carrier comprising a two-sided stop comprising two stop surfaces defining a cutter insert seat, the two stop surfaces spanning a first angle smaller than 90°, the cutter carrier further comprising at least one fixed stop defining a guide strip seat; and
    a plurality of kits, each kit comprising a cutting insert and at least one guide strip for equipping the cutter carrier according to a nominal diameter, each kit being associated with a certain nominal diameter in a nominal diameter range ($\Delta ND$), each cutting insert having two counter-stop surfaces for facing the stop surfaces when fixed in position at the cutter insert seat, the two stop surfaces spanning a second angle being larger than the first angle and each guide strip having counter-stop surfaces for facing the fixed stop when fixed in position at the guide strip seat.

11. The deep hole drill set according to claim 10, wherein the cutting inserts and the guide strips can each be screwed to the cutter carrier, wherein
    the cutting inserts each have a cutting insert through hole at the same distance from the respective counter-stop surfaces and
    the guide strips each have a guide strip through hole which extends between its counter-stop surface and a supporting surface.

12. The deep hole drill set according to claim 10, wherein the distance of the through hole to a minor cutting edge of a cutting insert to the next larger cutting insert increases by a specified amount by which the distance of the counter-stop surface and the supporting surface of the associated guide strip to the next larger guide strip increases.

* * * * *

UNITED STATES PATENT AND TRADEMARK OFFICE
CERTIFICATE OF CORRECTION

PATENT NO. : 7,296,953 B2 Page 1 of 1
APPLICATION NO. : 11/619311
DATED : November 20, 2007
INVENTOR(S) : Lothar Kuenzel It is certified that error appears in the above-identified patent and that said Letters Patent is hereby corrected as shown below:

*Title Page, Item (56), OTHER PUBLICATIONS:* please change

"Botek, Präzisions-Bohrtechnik GmbH, D-72585 Riederich, gaz. Sep. 9, 1997, Schultz, Änd-Stand: Feb. 24, 1999, BN-0122 B1.3, 1 page."

to

--Botek, Präzisions-Bohrtechnik GmbH, D-72585 Riederich, gaz. Sep. 23, 1997, Schultz, Änd-Stand: Feb. 24, 1999, BN-0122 B1.3, 1 page.--

Signed and Sealed this

Twenty-ninth Day of April, 2008

JON W. DUDAS
*Director of the United States Patent and Trademark Office*